United States Patent
Horng et al.

(10) Patent No.: US 6,534,893 B2
(45) Date of Patent: Mar. 18, 2003

(54) STATOR ASSEMBLY STRUCTURE OF A DIRECT CURRENT BRUSHLESS MOTOR

(75) Inventors: Alex Horng, Kaohsiung (TW); Yin tso-kuo, Kaohsiung Hsien (TW); Ching-shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/829,927

(22) Filed: Apr. 11, 2001

(65) Prior Publication Data

US 2002/0149284 A1 Oct. 17, 2002

(51) Int. Cl.$^7$ ................................................ H02K 1/00
(52) U.S. Cl. ........................ 310/254; 310/67 R; 310/91
(58) Field of Search .......................... 310/67 R, 49 R, 310/216, 217, 254, 259, 91, 42; 360/98.07, 99.04, 99.08; 417/423.12, 423.15, 423.07, 316, 420; 29/596–598

(56) References Cited

U.S. PATENT DOCUMENTS 6,121,710 A * 9/2000 Ho .............................. 310/254

* cited by examiner

Primary Examiner—Tran Nguyen
(74) Attorney, Agent, or Firm—Bacon & Thomas (57) ABSTRACT

A stator assembly structure of a direct current brushless motor includes a coil seat having a fitting hole for passage of the magnetic conducting tube. An upper pole plate and a lower pole plate are mounted above and under the coil seat respectively. At least one upper magnetic conducting plate and lower magnetic conducting plate are respectively bonded on the upper pole plate and the lower pole plate. Each of the upper pole plate, the lower pole plate, the upper magnetic conducting plate, and the lower magnetic conducting plate has a positioning hole for passage of the magnetic conducting tube. Side walls extending toward a vertical direction are formed on the pole ends of the upper pole plate, the lower pole plate, one upper magnetic conducting plate, or one lower magnetic conducting plate.

3 Claims, 8 Drawing Sheets

STATOR ASSEMBLY STRUCTURE OF A DIRECT CURRENT BRUSHLESS MOTOR

BACKGROUND OF THE INVENTION

1. Field of the Invention

The present invention relates to a stator assembly structure of a direct current brushless motor, and more particularly to a stator assembly structure of a direct current brushless motor which may decrease reluctance, and increase magnetic flux conducting effect, thereby further increase the rotational torque.

2. Description of the Related Prior Art

Figure 1:
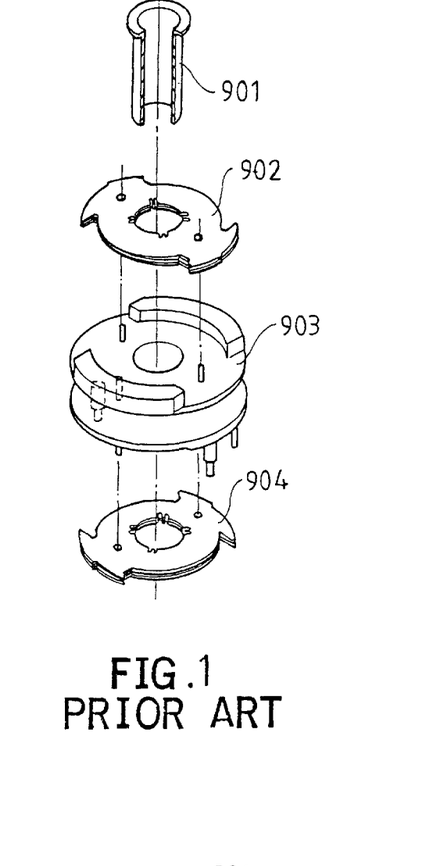
FIG. 1 is an exploded perspective view of a conventional stator assembly in accordance with the prior art.
Figure 2:
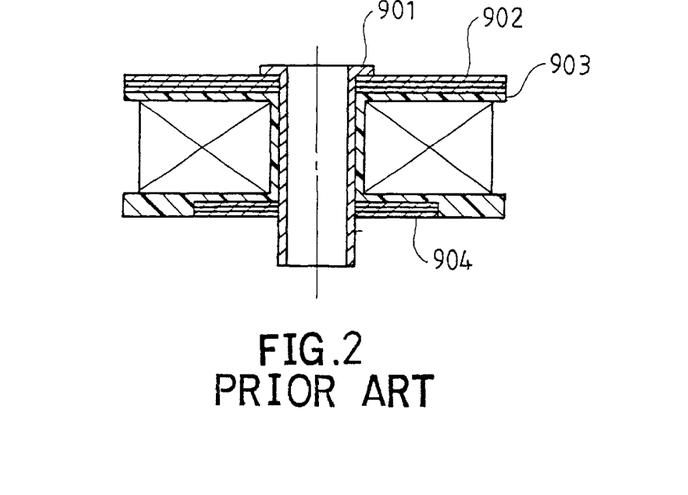
FIG. 2 is a cross-sectional assembly view of the conventional stator assembly as shown in FIG. 1.

A conventional stator assembly in accordance with the prior art shown in FIGS. 1 and 2 comprises a shaft tube 901 fitted with an upper pole plate 902, a coil seat 903, and a lower pole plate 904. The coils of the coil seat 903 are energized to produce a magnetic field, thereby forming a magnetic force passage through the shaft tube 901, the upper pole plate 902, and the lower pole plate 904, while the end edges of the upper pole plate 902 and the lower pole plate 904 are induced with the annular permanent magnet of the rotor, so that the rotor can be driven to rotate. In such a conventional stator assembly, the thickness of the end edges of the upper pole plate 902 and the lower pole plate 904 forms an inducing face to induce with the annular permanent magnet of the rotor. Thus, the inducing face is small, so that the rotational torque is not enough, and the rotational speed is unstable.

Figure 3:
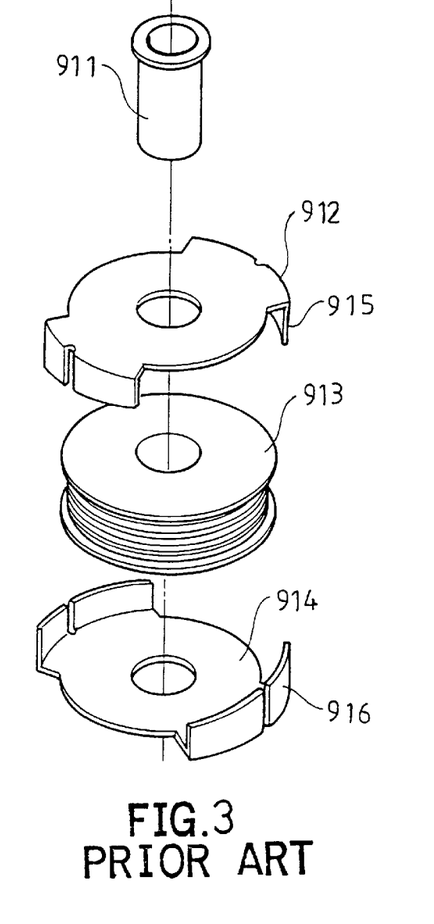
FIG. 3 is an exploded perspective view of another conventional stator assembly in accordance with the prior art.
Figure 4:
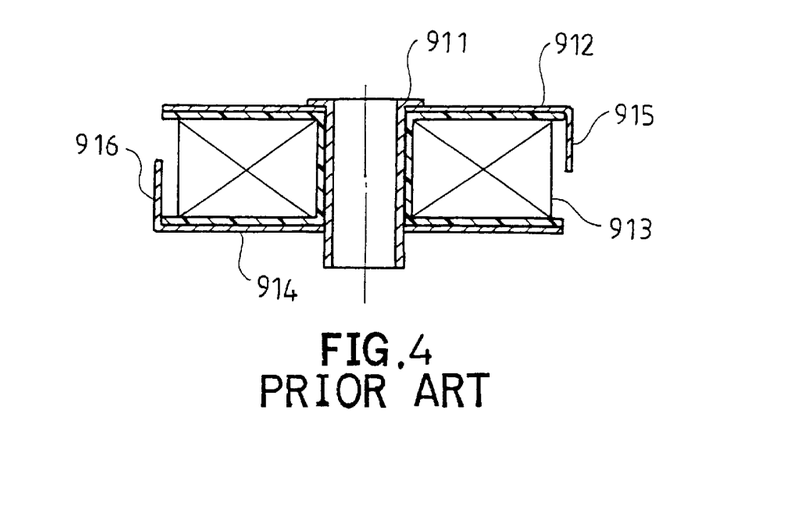
FIG. 4 is a cross-sectional assembly view of the conventional stator assembly as shown in FIG. 3.

Another conventional stator assembly in accordance with the prior art shown in FIGS. 3 and 4 comprises a shaft tube 911 fitted with an upper pole plate 912, a coil seat 913, and-a lower pole plate 914. The upper pole plate 912 and the lower pole plate 914 each have bent side walls 915, 916 extending toward the coil seat 913. Such a conventional stator assembly has the side walls 915, 916, so that the side walls 915, 916 of the upper pole plate 912 and the lower pole plate 914 will form a larger inducing face to induce with the annular permanent magnet of the rotor. The upper and lower pole plates are each formed by bending a silicon steel plate with an equal thickness. Thus, the side walls 915, 916 increase the inducing face, but the thickness of the cross-section of the magnetic conducting passage of the upper and lower pole plates is not increased. Therefore, the rotational torque is not enough, and the rotational speed is unstable, thereby incurring a floating problem.

SUMMARY OF THE INVENTION

The primary objective of the present invention is to provide a stator assembly structure of a direct current brushless motor which has a better magnetic conducting effect, thereby increasing the rotational torque of the motor.

In accordance with the present invention, there is provided a stator assembly structure of a direct current brushless motor includes a coil seat wound with coils and provided with a fitting hole through which the magnetic conducting tube passes. An upper pole plate is mounted above the coil seat, and a lower pole plate is mounted under the coil seat. Each of the upper pole plate and the lower pole plate is provided with pole ends. At least one upper magnetic conducting plate and lower magnetic conducting plate are respectively bonded on the upper pole plate and the lower pole plate. Each of the upper pole plate, the lower pole plate, the upper magnetic conducting plate, and the lower magnetic conducting plate has a positioning hole through which the magnetic conducting tube passes. Side walls extending toward a vertical direction are at least formed on the pole ends of the upper pole plate, the lower pole plate, or one upper magnetic conducting plate, or one lower magnetic conducting plate.

Further benefits and advantages of the present invention will become apparent after a careful reading of the detailed description with appropriate reference to the accompanying drawings.

DETAILED DESCRIPTION OF THE PREFERRED EMBODIMENTS

Figure 5:
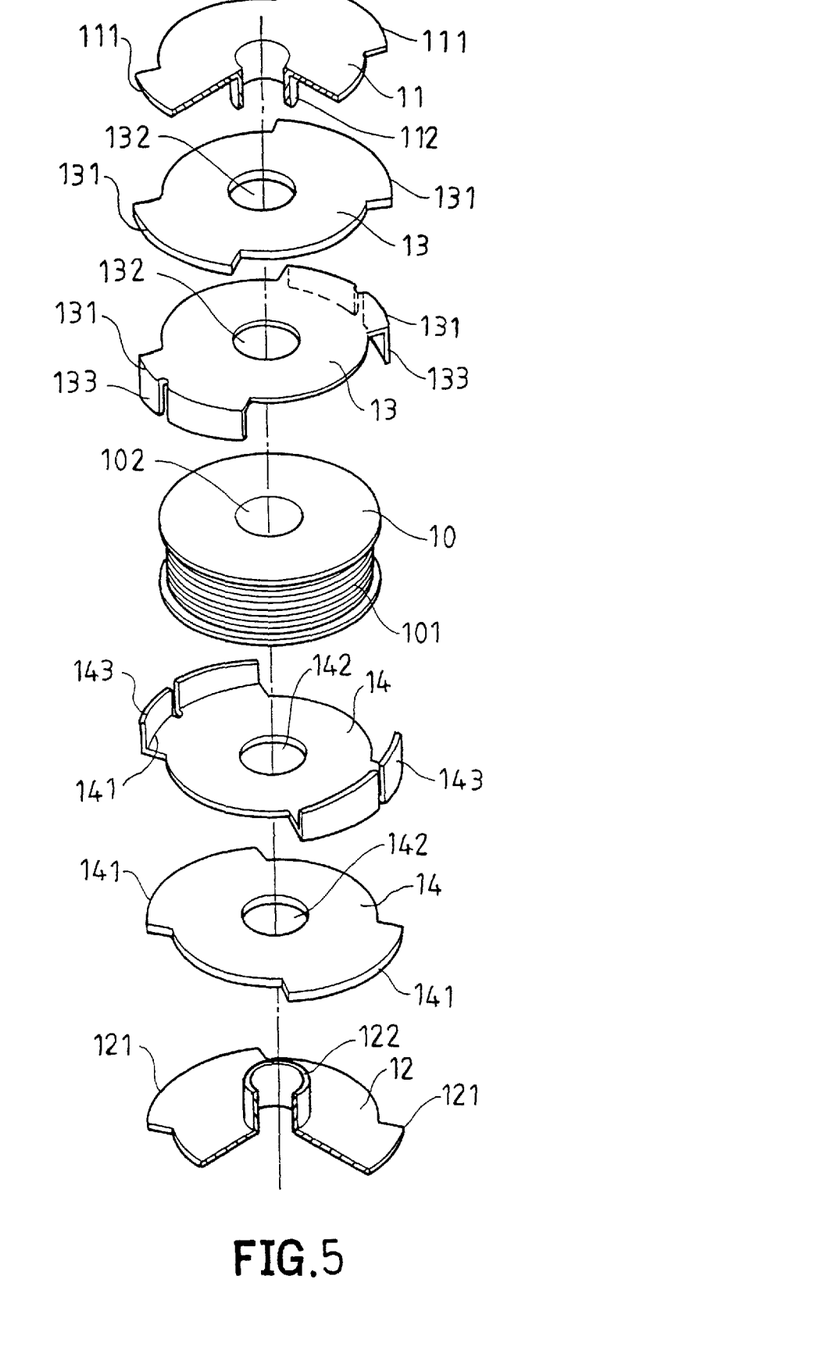
FIG. 5 is an exploded perspective view of a stator assembly structure of a direct current brushless motor in accordance with a first embodiment of the present invention.

Referring to the drawings and initially to FIG. 5, a stator assembly structure of a direct current brushless motor in accordance with a first preferred embodiment of the present invention comprises a coil seat 10, an upper pole plate 11, a lower pole plate 12, upper magnetic conducting plates 13, and lower magnetic conducting plates 14.

The coil seat 10 may be a coil seat of a conventional direct current brushless motor, heat dissipation fan etc. the coil seat 10 is wound with coils 101 and provided with a fitting hole 102 allowing combination of the upper pole plate 11 and lower pole plate 12.

The upper pole plate 11 is made of a magnetic conducting material, and the upper pole plate 11 is provided with pole ends 111 and a magnetic conducting tube 112 which may extend into the fitting hole 102 of the coil seat 10, thereby forming a magnetic conducting passage. The magnetic conducting tube 112 may receive a bearing therein for allowing pivot of a central shaft of a rotor.

The lower pole plate 12 is made of a magnetic conducting material, and the lower pole plate 12 is provided with pole ends 121 and a magnetic conducting tube 122 which may extend into the fitting hole 102 of the coil seat 10, thereby forming a magnetic conducting passage. The magnetic conducting tube 122 may receive a bearing therein for allowing pivot of the central shaft of the rotor.

The upper magnetic conducting plate 13 is made of a magnetic conducting material, and is mounted between the upper pole plate 11 and the coil seat 10. The present invention includes at least one upper magnetic conducting plate 13. The upper magnetic conducting plate 13 has pole ends 131 and a positioning hole 132, and the positioning hole 132 allows passage and combination of the magnetic conducting tube 112 of the upper pole plate 11. In the preferred embodiment, the magnetic conducting tube 112 of the upper pole plate 11 has an outer diameter greater than the diameter of the positioning hole 132 of the upper magnetic conducting plate 13, so that the magnetic conducting tube 112 may be combined in a tight fit manner. In addition, the pole ends 131 of at least one upper magnetic conducting plate 13 is provided with side walls 133 extending toward a vertical direction. The side walls 133 of the upper magnetic conducting plate 13 extend toward a direction adjacent to or far away from the coil seat 10. As shown in the figure, the side walls 133 extend toward the coil seat 10.

The lower magnetic conducting plate 14 is made of a magnetic conducting material, and is mounted between the lower pole plate 12 and the coil seat 10. The present invention includes at least one lower magnetic conducting plate 14. The lower magnetic conducting plate 14 has pole ends 141 and a positioning hole 142, and the positioning hole 142 allows passage and combination of the magnetic conducting tube 122 of the lower pole plate 12. In the preferred embodiment, the magnetic conducting tube 122 of the lower pole plate 12 has an outer diameter greater than the diameter of the positioning hole 142 of the lower magnetic conducting plate 14, so that the magnetic conducting tube 122 may be combined in a tight fit manner. In addition, the pole ends 141 of at least one lower magnetic conducting plate 14 is provided with side walls 143 extending toward a vertical direction. The side walls 143 of the lower magnetic conducting plate 14 extend toward a direction adjacent to or far away from the coil seat 10. As shown in the figure, the side walls 143 extend toward the coil seat 10.

Figure 6:
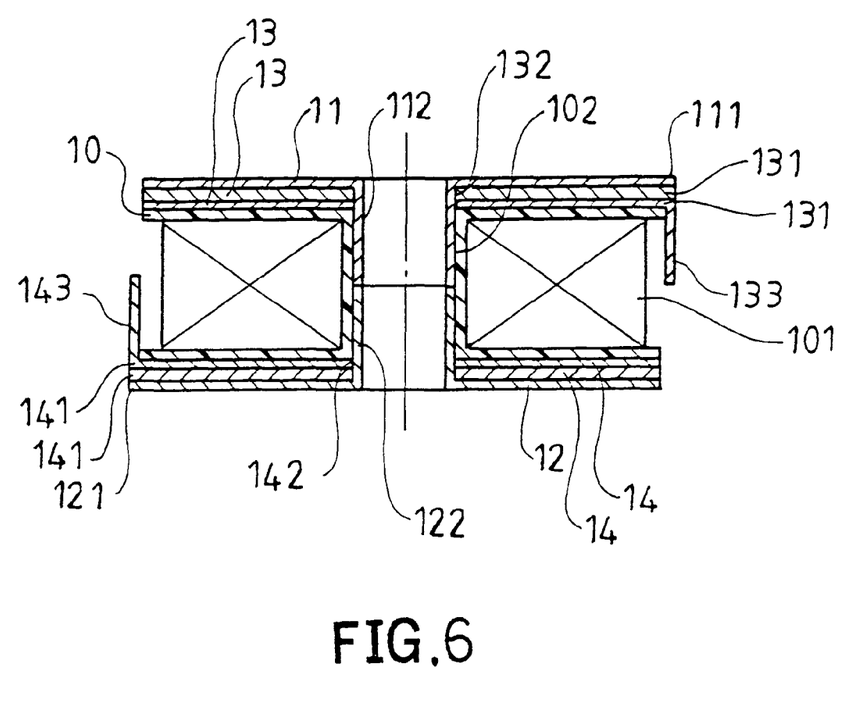
FIG. 6 is a cross-sectional assembly view of the stator assembly structure of a direct current brushless motor as shown in FIG. 5.

Referring to FIG. 6, the stator assembly structure of a direct current brushless motor in accordance with the first preferred embodiment of the present invention is assembled. After the magnetic conducting tubes 112, 122 of the upper pole plate 11 and the lower pole plate 12 are combined with the upper magnetic conducting plate 13 and the lower magnetic conducting plate 14, the magnetic conducting tubes 112, 122 are also combined in the fitting hole 102 of the coil seat 10 to contact with each other, so that the magnetic conducting tubes 112, 122 have a magnetic force conducting effect, while the upper pole plate 11 and the lower pole plate 12 together with the mating upper magnetic conducting plate 13 and lower magnetic conducting plate 14 may form a wider magnetic force passage. Thus, the upper pole plate 11 and the upper magnetic conducting plate 13 are stacked on the top of the coil seat 10, while the lower pole plate 12 and the lower magnetic conducting plate 14 are stacked on the bottom of the coil seat 10, while the upper magnetic conducting plate 13 is extended with the side walls 133 and the lower magnetic conducting plate 14 is extended with the side walls 143, thereby forming a larger sensing area, and thereby providing a better magnetic conducting effect. Therefore, when the annular permanent magnet of the rotor is induced therewith, the rotor may have a larger rotational torque, thereby forming a more stable rotation.

Figure 7:
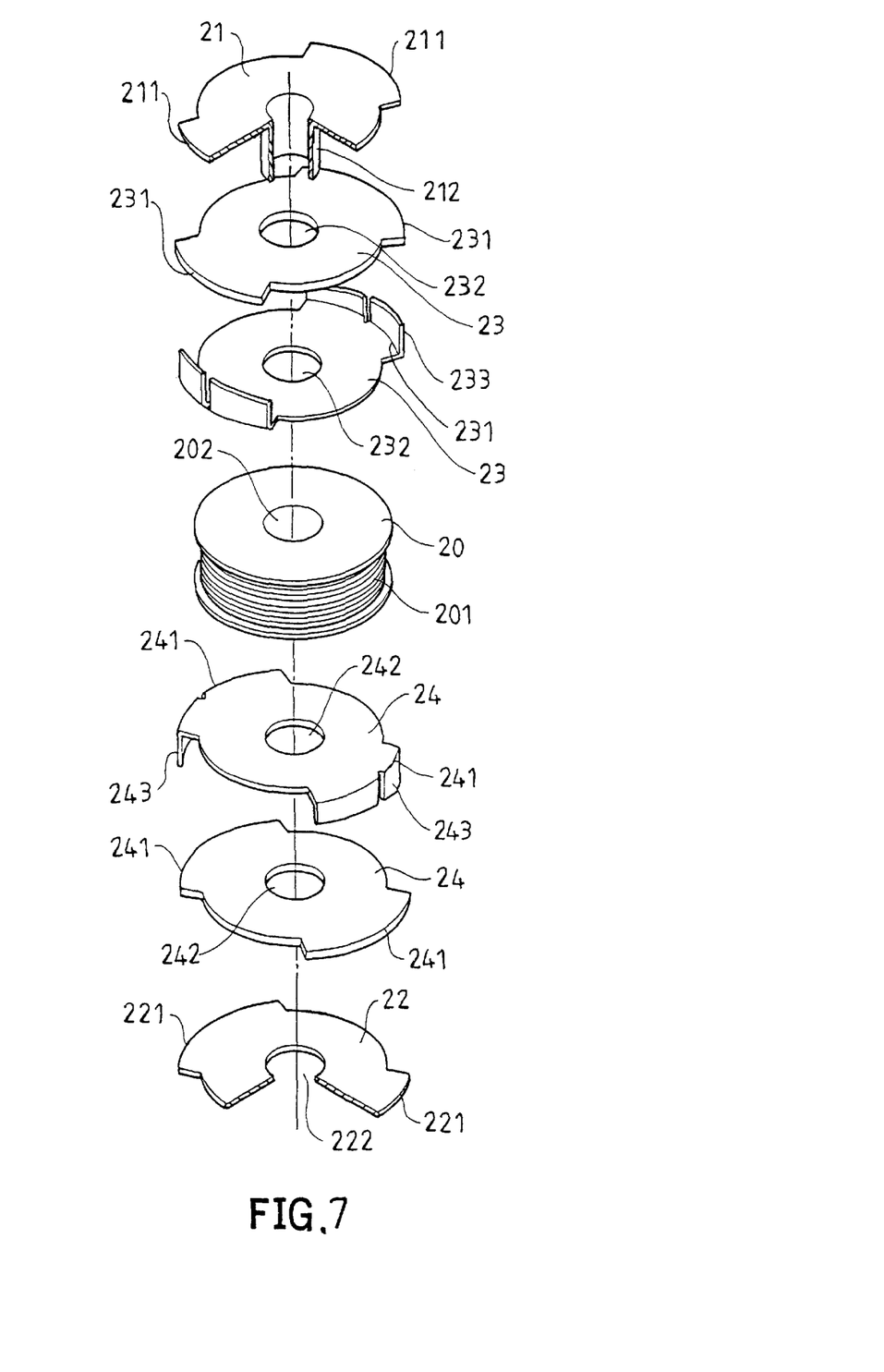
FIG. 7 is an exploded perspective view of a stator assembly structure of a direct current brushless motor in accordance with a second embodiment of the present invention.

Referring to FIG. 7, a stator assembly structure of a direct current brushless motor in accordance with a second preferred embodiment of the present invention comprises a coil seat 20, an upper pole plate 21, a lower pole plate 22, upper magnetic conducting plates 23, and lower magnetic conducting plates 24.

In the preferred embodiment, the upper pole plate 21 is provided with pole ends 211 and a magnetic conducting tube 212, and the magnetic conducting tube 212 of the upper pole plate 21 passes through the positioning holes 232, 242, 222 of the upper magnetic conducting plate 23, the lower magnetic conducting plate 24, and the lower pole plate 22, and through the fitting hole 202 of the coil seat 20. The magnetic conducting tube 212 may form a magnetic conducting passage, and may receive a bearing therein for allowing pivot of the central shaft of the rotor.

The lower pole plate 22 is provided with pole ends 221 and a positioning hole 222, and the positioning hole 222 allows combination of the magnetic conducting tube 212. In the preferred embodiment, the magnetic conducting tube 212 of the upper pole plate 21 has an outer diameter greater than the diameter of the positioning hole 222 of the lower pole plate 22, so that the magnetic conducting tube 212 may be combined in a tight fit manner.

The present invention may have at least one upper magnetic conducting plate 23, and at least one lower magnetic conducting plate 24. The upper magnetic conducting plate 23 has pole ends 231 and a positioning hole 232, and the lower magnetic conducting plate 24 has pole ends 241 and a positioning hole 242. The pole ends 231 of at least one upper magnetic conducting plate 23 are provided with side walls 233 extending toward a vertical direction, and the pole ends 241 of at least one lower magnetic conducting plate 24 are provided with side walls 243 extending toward a vertical direction. The side walls 233, 243 may respectively extend toward a direction adjacent to or far away from the coil seat 20. In the figure, the side walls 233, 243 may respectively extend toward a direction far away from the coil seat 20.

Figure 8:
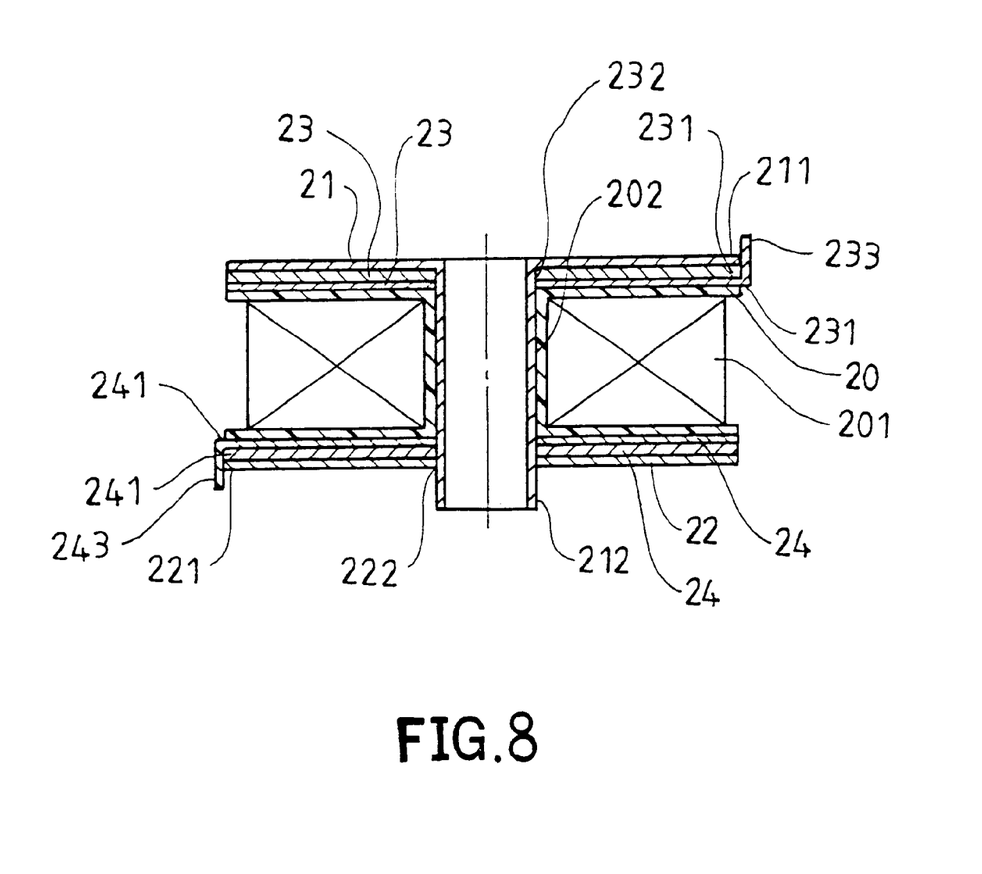
FIG. 8 is a cross-sectional assembly view of the stator assembly structure of a direct current brushless motor as shown in FIG. 7.

Referring to FIG. 8, the stator assembly structure of a direct current brushless motor in accordance with the second preferred embodiment of the present invention is assembled. The magnetic conducting tube 212 of the upper pole plate 21 passes through the positioning holes 232, 242, 222 of the upper magnetic conducting plate 23, the lower magnetic conducting plate 24, and the lower pole plate 22, and through the fitting hole 202 of the coil seat 20. The order of the magnetic conducting tube 212 of the upper pole plate 21 passing through the lower magnetic conducting plate 24, and the lower pole plate 22 is not limited as shown in the figure. The lower pole plate 22 may also be sandwiched between the lower magnetic conducting plate 24 and the coil seat 20. Thus, the magnetic conducting tube 212 has a magnetic force conducting effect, while the upper pole plate 21 and the lower pole plate 22 together with the mating upper magnetic conducting plate 23 and lower magnetic conducting plate 24 may form a wider magnetic force passage. Thus, the upper pole plate 21 and the upper magnetic conducting plate 23 are stacked on the top of the coil seat 20, while the lower pole plate 22 and the lower magnetic conducting plate 24 are stacked on the bottom of the coil seat 20, while the upper magnetic conducting plate 23 is extended with the side walls 233 and the lower magnetic conducting plate 24 is extended with the side walls 243, thereby forming a larger sensing area, and thereby providing a better magnetic conducting effect. Therefore, when the annular permanent magnet of the rotor is induced therewith, the rotor may have a larger rotational torque, thereby forming a more stable rotation.

Figure 9:
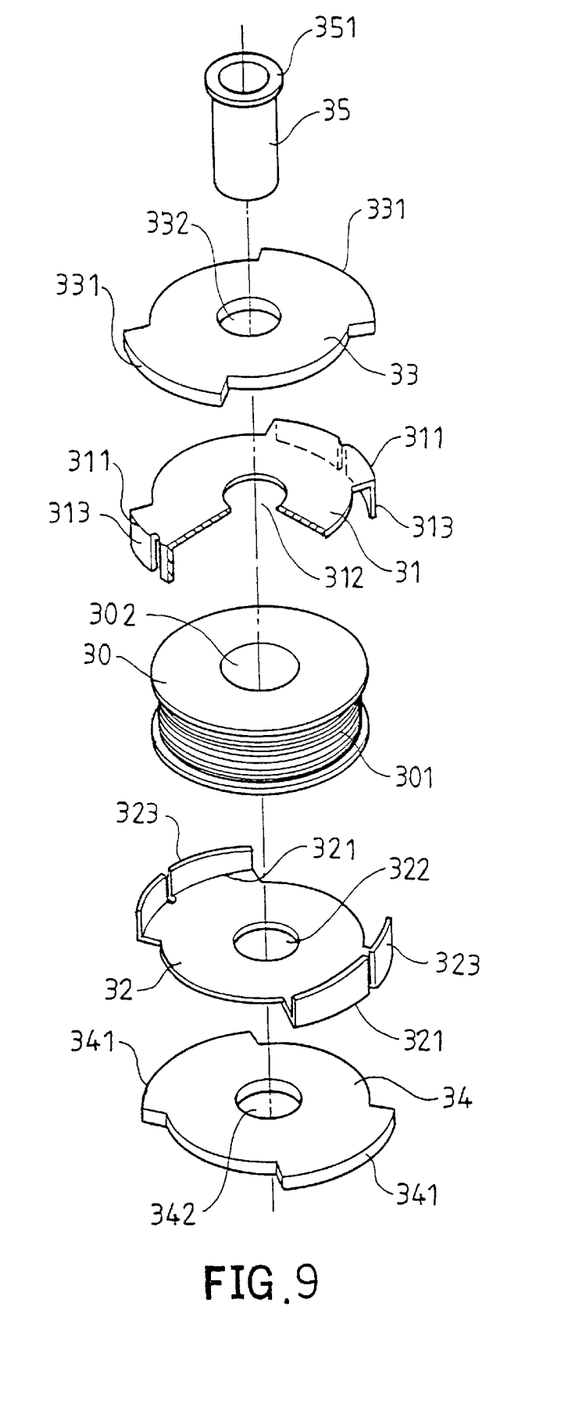
FIG. 9 is an exploded perspective view of a stator assembly structure of a direct current brushless motor in accordance with a third embodiment of the present invention.

Referring to FIG. 9, a stator assembly structure of a direct current brushless motor in accordance with a third preferred embodiment of the present invention comprises a coil seat 30, an upper pole plate 31, a lower pole plate 32, upper magnetic conducting plates 33, lower magnetic conducting plates 34, and a magnetic conducting tube 35.

In the preferred embodiment, the a coil seat 30 is wound with coils 301, and provided with a fitting hole 302 in which the magnetic conducting tube 35 is fitted.

The upper pole plate 31 is made of a magnetic conducting material, and has pole ends 311 and a positioning hole 312, and the positioning hole 312 allows passage and combination of the magnetic conducting tube 35. In the preferred embodiment, the magnetic conducting tube 35 has an outer diameter greater than the diameter of the positioning hole 312, so that the magnetic conducting tube 35 may be combined in a tight fit manner. The pole ends 311 of the upper pole plate 31 is provided with side walls 313 extending toward a vertical direction, and the side walls 313 may extend toward the direction adjacent to or far away from the coil seat 30.

The lower pole plate 32 is made of a magnetic conducting material, and has pole ends 321 and a positioning hole 322, and the positioning hole 322 allows passage and combination of the magnetic conducting tube 35. In the preferred embodiment, the magnetic conducting tube 35 has an outer diameter greater than the diameter of the positioning hole 322, so that the magnetic conducting tube 35 may be combined in a tight fit manner. The pole ends 321 of the lower pole plate 32 is provided with side walls 323 extending toward a vertical direction, and the side walls 323 may extend toward the direction adjacent to or far away from the coil seat 30.

Figure 10:
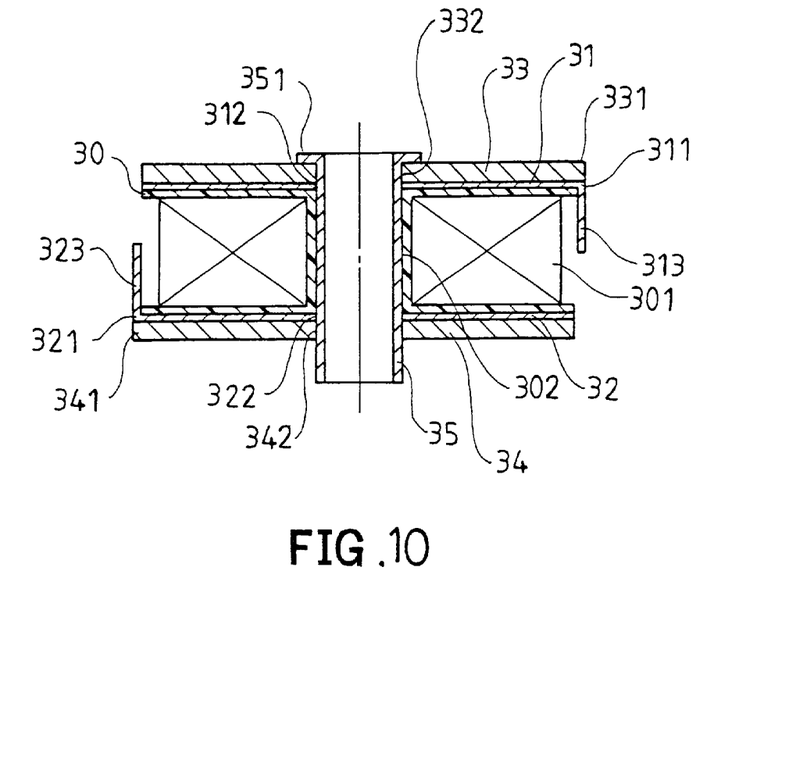
FIG. 10 is a cross-sectional assembly view of the stator assembly structure of a direct current brushless motor as shown in FIG. 9.
Figure 11:
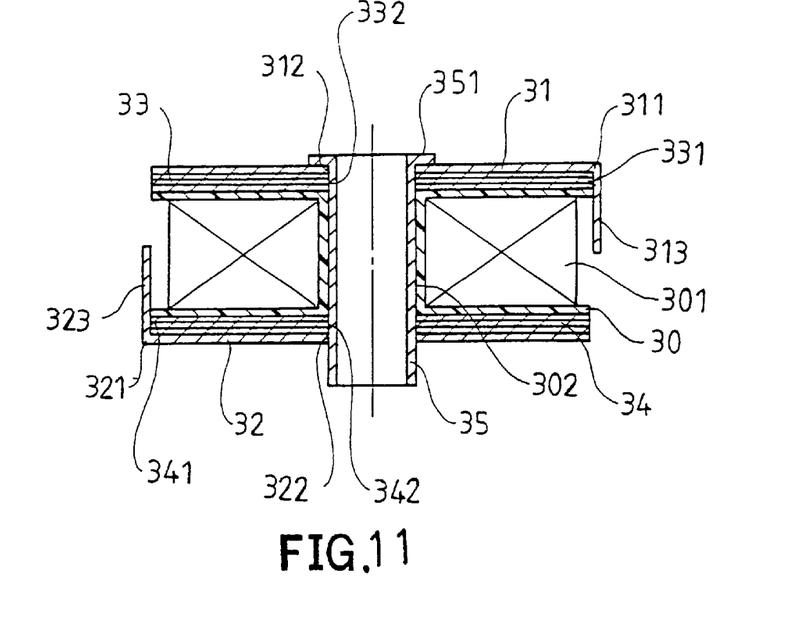
FIG. 11 is another cross-sectional assembly view of the stator assembly structure of a direct current brushless motor as shown in FIG. 9.

The upper magnetic conducting plate 33 is made of a magnetic conducting material, and may be mounted on the other side of the upper pole plate 31 whose one side is bonded on the coil seat 30 as shown in FIGS. 9 and 10, or bonded between the upper pole plate 31 and the coil seat 30 as shown in FIG. 11, or may be simultaneously bonded between the upper pole plate 31 and the coil seat 30, and mounted on the other side of the upper pole plate 31 whose one side is bonded on the coil seat 30. The present invention includes at least one upper magnetic conducting plate 33, and the upper magnetic conducting plate 33 has pole ends 331 and a positioning hole 332, and the positioning hole 332 allows combination of the magnetic conducting tube 35. In the preferred embodiment, the magnetic conducting tube 35 has an outer diameter greater than the diameter of the positioning hole 332 of the upper pole plate 33, so that the magnetic conducting tube 35 may be combined in a tight fit manner.

The lower magnetic conducting plate 34 is made of a magnetic conducting material, and may be mounted on the other side of the lower pole plate 32 whose one side is bonded on the coil seat 30 as shown in FIGS. 9 and 10, or bonded between the lower pole plate 32 and the coil seat 30 as shown in FIG. 11, or may be simultaneously bonded between the lower pole plate 32 and the coil seat 30, and mounted on the other side of the lower pole plate 32 whose one side is bonded on the coil seat 30. The present invention includes at least one lower magnetic conducting plate 34, and the lower magnetic conducting plate 34 has pole ends 341 and a positioning hole 342, and the positioning hole 342 allows combination of the magnetic conducting tube 35. In the preferred embodiment, the magnetic conducting tube 35 has an outer diameter greater than the diameter of the positioning hole 342 of the lower pole plate 34, so that the magnetic conducting tube 35 may be combined in a tight fit manner.

The magnetic conducting tube 35 is made of a magnetic conducting material, and may pass through the positioning holes 312, 322, 332, 342 of the upper pole plate 31, the lower pole plate 32, the upper magnetic conducting plate 33, and the lower magnetic conducting plate 34, and through the fitting hole 302 of the coil seat 30. In the preferred embodiment, the diameter of the magnetic conducting tube 35 may be slightly greater than the diameter of the positioning holes 312, 322, 332, 342, so that the magnetic conducting tube 35 may be combined in a tight fit manner. In addition, the magnetic conducting tube 35 is provided with an annular lip 351 for preventing detachment of the said parts. The magnetic conducting tube 35 may form a magnetic conducting passage, and may receive a bearing therein for allowing pivot of the central shaft of the rotor.

Referring to FIG. 10, the stator assembly structure of a direct current brushless motor in accordance with the third preferred embodiment of the present invention is assembled. The magnetic conducting tube 35 passes through the upper pole plate 31, the lower pole plate 32, the upper magnetic conducting plate 33, the lower magnetic conducting plate 34, and the coil seat 30. Thus, the magnetic conducting tube 35 has a magnetic force conducting effect, while the upper pole plate 31 and the lower pole plate 32 together with the mating upper magnetic conducting plate 33 and lower magnetic conducting plate 34 may form a wider magnetic force passage. Thus, the upper pole plate 31 and the upper magnetic conducting plate 33 are stacked on the top of the coil seat 30, while the lower pole plate 32 and the lower magnetic conducting plate 34 are stacked on the bottom of the coil seat 30, while the upper pole plate 31 is extended with the side walls 313 and the lower pole plate 32 is extended with the side walls 323, thereby forming a larger sensing area, and thereby providing a better magnetic conducting effect. Therefore, when the annular permanent magnet of the rotor is induced therewith, the rotor may have a larger rotational torque, thereby forming a more stable rotation.

Accordingly, the stator assembly structure of a direct current brushless motor in accordance with the present invention includes at least one upper magnetic conducting plate and at least one lower magnetic conducting plate which may be stacked, and may be bonded on the upper pole plate and the lower pole plate respectively. Thus, the extended side walls and the annular permanent magnet of the rotor will have a larger sensing area, while the stacked upper magnetic conducting plate, upper magnetic conducting plate, and the lower magnetic conducting plate, lower pole plate will increase the magnetic force passage. Therefore, the rotor may have a better rotational torque and will not float during rotation, thereby forming a more stable rotation.

Although the invention has been explained in relation to its preferred embodiment as mentioned above, it is to be understood that many other possible modifications and variations can be made without departing from the scope of the present invention. It is, therefore, contemplated that the appended claims will cover such modifications and variations that fall within the true scope of the invention.

What is claimed is:

1. A stator assembly structure of a direct current brushless motor, comprising:

a coil seat, wound with coils and provided with a fitting hole;

an upper pole plate, located under the coil seat, the lower pole plate provided with pole ends and a magnetic conducting tube;

a lower pole plate, located under the coil seat, the lower pole plate provided with pole ends and a magnetic conducting tube;

at least one upper magnetic conducting plate, having pole ends and a positioning hole, the positioning hole allowing passage of the magnetic conducting tube of the upper pole plate, and the pole ends of the at least one upper magnetic conducting plate being provided with side walls extending toward a vertical direction;

the magnetic conducting tubes of the upper pole plate and the lower pole plate passing through the upper magnetic conducting plate and the lower magnetic conducting plate, and then combining with the fitting hole of the coil seat, and said magnetic conducting tubes of the upper pole plate and the lower pole plate each having an outer diameter greater than the diameter of the positioning holes of the upper magnetic conducting plate and the lower magnetic conducting plate, so that the magnetic conducting tubes may be combined in a tight fit manner.

2. The stator assembly structure of a direct current brushless motor as claimed in claim 1, wherein the side walls of the upper magnetic conducting plate extend toward a direction adjacent to or far away from the coil seat.

3. The stator assembly structure of a direct current brushless motor as claimed in claim 1, wherein the side walls of the lower magnetic conducting plate extend toward a direction adjacent to or far away from the coil seat.

* * * * *